Jan. 15, 1963  J. RUDELICK  3,073,674
WATER SOFTENING APPARATUS
Filed Dec. 16, 1959  7 Sheets-Sheet 3

Inventor
John Rudelick
By
Attorney

Jan. 15, 1963 J. RUDELICK 3,073,674
WATER SOFTENING APPARATUS
Filed Dec. 16, 1959 7 Sheets-Sheet 5

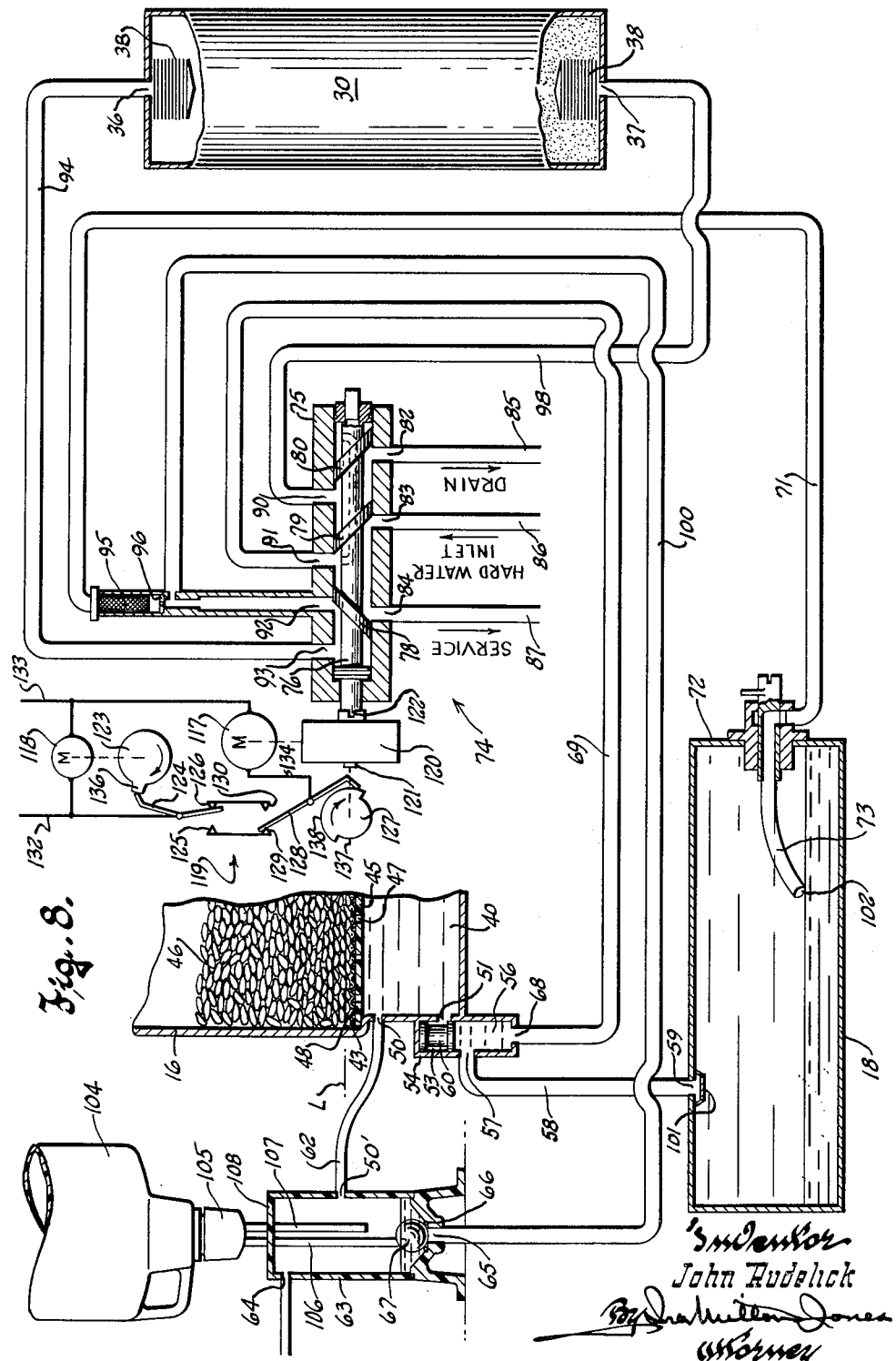

United States Patent Office 3,073,674
Patented Jan. 15, 1963

3,073,674
WATER SOFTENING APPARATUS
John Rudelick, Milwaukee, Wis., assignor to Bruner Corporation, Milwaukee, Wis., a corporation of Wisconsin
Filed Dec. 16, 1959, Ser. No. 859,871
15 Claims. (Cl. 23—112)

This invention relates to water treating apparatus generally, and has more particular reference to improvements in automatic water softeners, especially those intended for residential use.

Most non-commercial automatic water softening apparatus heretofore available comprised a rather large self supporting mineral tank, sometimes standing as much as six feet high, and a separate self supporting brine tank usually incorporating a large bin to hold a substantial quantity of salt. Though the brine tank was considerably shorter than the mineral tank, it was often several times larger in diameter.

Needless to say, little could be done to enhance the appearance of this combination of a tall and slender mineral tank with a short and wide brine tank, and the unattractiveness of conventional equipment of this type has been accepted out of necessity. The connections between the brine and mineral tanks, which were usually afforded by pipes that were exposed to view, constituted a further aggravation by adding to the unsightly appearance of the installation.

It is not difficult to appreciate, therefore, the incongruity of such installations in the laundry or utility rooms of modern homes, and especially those without basements.

In contrast it is the main object of this invention to provide an improved automatic water softening apparatus which features a compact and novel arrangement of components which, though they include a large salt bin, may be housed in a particularly neat and modern appearing cabinet of countertop height capable of installation alongside present day washing machines and dryers without looking out of place.

It is also an object of this invention to provide a simple but reliable low cost water softening apparatus of the character described, which effects substantially great economies in salt and water consumption during regeneration or recharging of the ion exchange resin in its softener tank.

In this latter respect, it is a purpose of this invention to provide an automatic water softening apparatus of the character described with improved brine making, storing and dispensing means, the components of which are separated and located remote from one another to facilitate their placement in the most advantageous positions in the softener cabinet, from the standpoint of compactness.

The brine making, storing and dispensing means of this invention functions on the same principle as that disclosed in my copending application Serial No. 770,794, filed October 30, 1958, and now abandoned. It also comprises a dry salt bin having a vessel in its bottom adapted to hold a supply of water. Brine is formed in the vessel by contact between water therein and the bottom portion of a supply of salt maintained in an almost completely dry state in the bin.

A water filled brine storage tank below the vessel, having controllable communication therewith, enables the contents of the vessel and storage tank to be exchanged by gravity induced natural circulation, namely the upward displacement into the vessel of water contained in the brine storage tank by the downward gravity induced flow into the vessel of the heavier brine from the vessel thereabove.

In such brine making apparatus, the concentrated brine stored in the tank beneath the vessel is expelled through an outlet duct therefor as a consequence of the introduction of fresh water into the upper portion of the brine storage tank. Hence, the admittance of a predetermined quantity of fresh water into the storage tank effects expulsion through its outlet duct of an exactly equal amount of concentrated brine.

However, during periods at which brine is being made, the salt entering into solution with the water displaced into the brine making vessel from the storage tank increases the total volume of liquid in the system by an amount proportionate to the amount of salt dissolved in the water. There may be as much as a 9% increase in the volume of liquid due to the salt added thereto. Obviously, after a number of regenerating cycles, it would be possible for the level of water contained in the brine making vessel to rise far beyond a predetermined and desired level to a height such as to substantially engulf the entire supply of salt contained in the bin thereabove.

Consequently, in order to preserve the known advantages of a dry salt system, it was necessary heretofore to provide an overflow port in the side of the brine making vessel, to enable surplus liquid to be conducted to a drain and to maintain a predetermined surface level for the water in the brine making vessel. This has the disadvantage, however, of being wasteful of salt.

With that objection in mind, it is another purpose of this invention to provide a water softening apparatus wherein such excess brine is usefully employed for regeneration of the ion exchange material in the softener tank.

More specifically, it is a purpose of this invention to provide water softening apparatus with brine making, storing and dispensing means of the character described wherein the excess brine is educted from the brine making vessel during each regenerating cycle and fed into the mineral tank for regenerating purposes as a consequence of the flow of concentrated brine into the mineral tank from the brine storage tank.

Still another object of this invention resides in the provision of water softening apparatus of the character described which incorporates a receptacle that is so communicated with the brine making vessel as to not only serve as a sight glass by which the level of brine in the vessel may be observed, but to also govern the amount of liquid educted from the vessel and thereby establish said predetermined level of liquid in the vessel.

A further object of this invention resides in the provision of water softening apparatus of the character described wherein said receptacle serves not only as a sight glass but also as a feed pot into which a predetermined amount of chemical, having characteristics such as to exert a cleansing effect upon the ion exchange material in the mineral tank, may be automatically dispensed and fed into the mineral tank as a consequence of the eduction of brine from the brine making vessel.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 8 is a similar diagrammatic view but depicting the routing of water and brine during regeneration or recharging of the ion exchange material in the softener tank.

Figure 1:
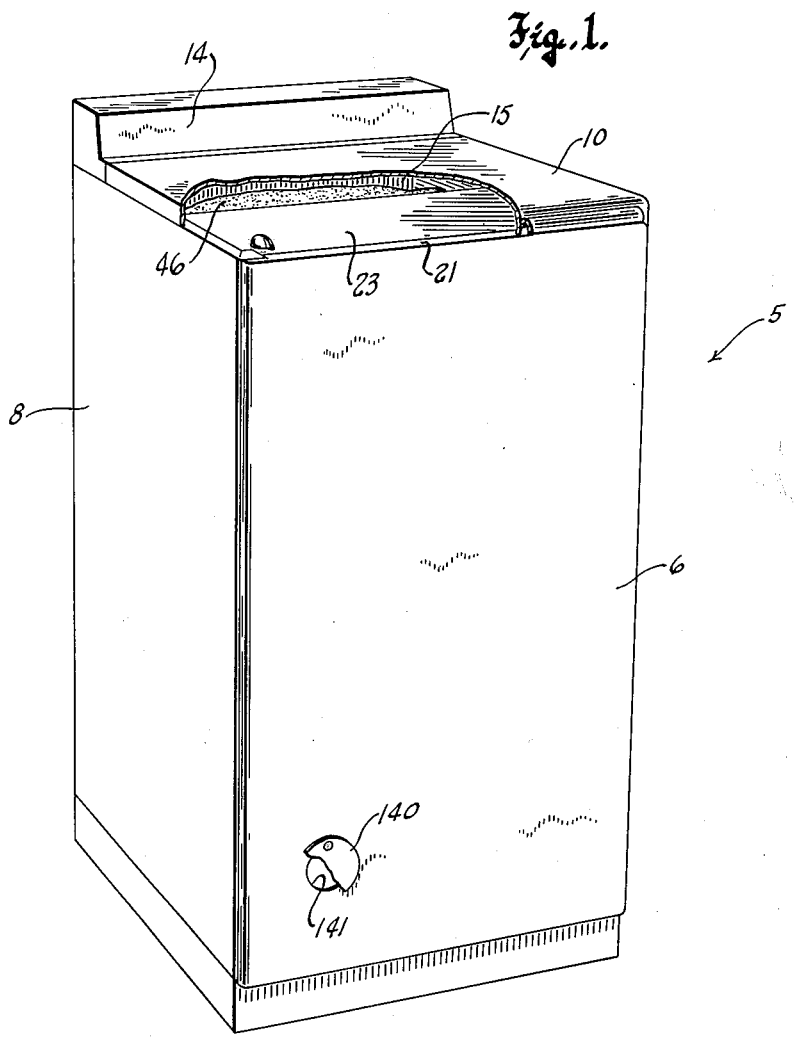
FIGURE 1 is a perspective view of the cabinet containing the water softener of this invention, portions of its cover being broken away.

Referring now more particularly to the accompanying drawings, wherein like reference characters have been applied to like parts throughout the views, the numeral 5 generally designates the cabinet in which the water softening apparatus of this invention is housed. The cabinet is of countertop height and in general conforms to the shape and size of those provided for modern appliances such as washing machines, dryers and dishwashers. It has somewhat greater depth than width, and is defined by upright front and back wall panels 6 and 7, respectively, joined by opposite vertical side wall panels 8 and 9, and horizontal top and upwardly offset bottom walls 10 and 11, respectively. All of said walls are made of sheet metal having a baked enamel finish, and they have a generally rectangular shape.

The top wall 10 has its rear edge connected by a transverse piano hinge 13 with a name plate bar 14 secured to the top of the cabinet and extending across the rear thereof. The top wall provides a cover having its free edge foremost, which may be swung upwardly about its hinge to afford access to a large and deep upwardly opening compartment 15 in the rear portion of the cabinet, containing a salt storage bin 16 of generous proportions.

The front panel 6 is also removable to provide access from the front of the cabinet to a bottom compartment 17 in which a brine storage tank 18 is mounted, and a front compartment 19 ahead of the salt bin 16, in which the remaining components of the water softening apparatus are mounted. The front panel is readily detachably connected to the front of the cabinet by means of rearwardly directed flanges 21 and 22 on its top and bottom edges, respectively, which flanges rest upon front portions of the bottom wall 11 and a horizontal upper shelf 23 that provides a top wall for the front compartment 19. Upwardly projecting pins 24 fixed with respect to the bottom wall 11 and the upper shelf 23 near the sides of the front panel, project through suitable locating holes in the flanges 21 and 22. Hence, the front panel may be detached merely by lifting it upwardly a distance to disengage the pins 24 from their locating holes. Since the hinged cover 10 normally extends over the upper shelf 23 and the top flange 21 on the front panel, detachment of the latter from the cabinet first entails swinging of the cover to an upright, slightly rearwardly inclined position such as seen in broken lines in FIGURE 2.

The top of the lower compartment 17 containing the brine storage tank 18 is defined by a horizontal lower shelf 26 that extends entirely across the interior of the cabinet, from the front to the rear thereof, and is fixed to the side and back walls so as to occupy an intermediate position spaced a substantially greater distance from the top of the cabinet than from its bottom. In similar fashion, the rear of the front compartment 19 is defined by an upright partition 27 that may be integrally connected to the transversely extending rear edge of the upper shelf 23. The partition extends transversely across the interior of the upper front portion of the cabinet, and has its lower edge fixed in abutting relation to the lower shelf 26.

The partition 27 is spaced a substantially greater distance from the back of the cabinet than from its front, and it and the portion of the lower shelf 26 rearwardly thereof provide the front and bottom walls, respectively, of the compartment 15 containing the salt bin 16. Since the remaining walls of the compartment 15 are provided by the cabinet back and sides, it will be appreciated that the compartment 15 constitutes by far the largest in the cabinet. Since the salt bin 16 forms in effect a liner for the large compartment 15, it is able to hold as much or more salt than the brine tanks of conventional automatic softeners. It can easily store 250 pounds of pellet salt, and an even greater quantity of rock salt.

The brine storage tank 18 is an elongated vessel mounted in the bottom compartment 17 of the cabinet to extend horizontally alongside the lefthand side wall 8. A U-shaped sheet metal bracket 28 fixed to the cabinet and secured to the front end of the brine storage tank cooperates with a connection 29 between the rear panel and the adjacent rear end of the tank to hold the brine tank in place in the lower compartment resting lengthwise upon the bottom wall 11 of the cabinet.

All of the other components of the softening apparatus of this invention are contained within the front compartment 19 of the cabinet, ahead of the compartment 15 containing the salt bin 16. These components include an elongated mineral tank 30 vertically mounted in the front compartment 19 in a position directly alongside the righthand side wall 9 of the cabinet. The length of the mineral tank 30 is greater than the vertical dimension of the front compartment 19. For that reason, the lower shelf 26 has a hole 31 formed therein to allow the lower end portion of the mineral tank to project therethrough and into the bottom compartment 17, where it occupies a position laterally adjacent to the front end portion of the brine storage tank 18.

The mineral tank is supported in the position described by top and bottom substantially U-shaped sheet metal brackets each having a bight portion 32 and opposite legs 33 extending therefrom. The bight portion of the top bracket is secured to the front face of the partition 27 and its opposite legs extend forwardly toward the upper end of the mineral tank to be secured to lugs thereon as by bolts 34. The mineral tank rests upon the lower bracket and for that reason the bight portion of the latter is secured to the bottom wall 11, and its legs extend upwardly to be connected to the lower end of the tank as by bolts 34'.

The mineral tank 30 contains a quantity of ion exchange mineral, preferably a synthetic resin such as now widely used for water softening purposes. For example, one-half a cubic foot of such mineral is all that is required in the softener tank. The tank 30 has flow ports 36 and 37 in its top and bottom, respectively, to provide for circulation of liquid through the tank. Preferably each of these ports opens to the interior of the tank through a distributor 38 of a known type.

During normal operation of the water softener of this invention, the port 37 at the bottom of the mineral tank serves as the inlet through which hard water enters the tank, while the port 36 at the top of the tank serves as the outlet for softened water. As will be described hereinafter, however, the flow relationship of the ports 36 and 37 is reversed during regeneration, i.e., the top port 36 becomes the inlet and the bottom port 37 becomes the outlet of the tank.

As indicated previously, the water softening apparatus of this invention incorporates brine making, storing, and dispensing means which functions similarly to that forming the subject of my copending application Serial No. 770,794, now abandoned, filed October 30, 1958. In this case (however, the brine making, storing, and dispensing means is constructed quite differently.

As will be now seen, the brine making, storing, and dispensing means comprises a brine forming vessel 40 which is supported on the lower shelf 26 and is provided by the lower portion of the salt bin 16 itself. A lower portion 42 of the vessel has walls which are offset inwardly a slight amount to provide an upwardly facing internal shoulder or ledge 43 extending all around the inside of the vessel, and spaced a distance above the bottom of the vessel.

The ledge 43 on the inside of the brine making vessel provides for the support of a foraminous platform 45 upon which a substantially large supply of rock or pellet salt 46 may be supported in the salt bin. Inasmuch as the platform has substantially large apertures 47 therein, a screen 48 is placed over the foraminous platform to prevent salt crystals or pellets from dropping through the apertures in the platform.

With this construction, it will be appreciated that the foraminous shelf 45 and the screen 48 thereon provide a false bottom in the salt bin to hold a supply of salt therein spaced a distance above the bottom of the brine forming vessel. The platform that provides this false bottom may be of relatively light gauge material, inasmuch as its central portions are reinforced against downward flexure by a plurality of spaced apart upwardly indented pedestal-like formations 49 in the bottom wall of the vessel.

The brine forming vessel 40 is adapted to be filled with water to a level L slightly above that of the foraminous platform 45, and it has two ports opening through the front of its inwardly indented lower portion 42. One of these ports, designated 50, is spaced a small distance below the ledge 43 on the vessel. The other serves as a liquid transfer port 51 close to the bottom of the vessel at a location substantially over the brine storage tank 18.

The port 51 opens through a forwardly extending neck 52, the front of which bears against the rear of the partition 27, in alignment with a hole (not shown) in the partition, and serves to communicate the lower portion 42 of the brine making vessel with the upper chamber 53 of a brine valve 54.

The brine valve is supported in the front compartment 19 by screws (not shown) that thread into nuts on the rear of the partition 27 to mount the valve at a location just above the level of the lower shelf 26. The brine valve 54, which is similar in function to that disclosed in my aforesaid copending application, Serial No. 770,794, now abandoned, also has a lower chamber 56 and a second port 57 opening to its side intermediate the upper and lower compartments 53 and 56, respectively. The port 57 is communicated by a duct 58 with an inlet port 59 in the top of the brine storage tank 18.

The brine valve 54 has a fluid pressure responsive piston 60 which is spring biased to a normal position within the lower compartment 56 of the valve at which the ports 51 and 57 establish communication between the interiors of the brine storage tank 18 and the liquid filled bottom portion of the brine forming vessel 40. Thus, assuming that the brine storage tank 18 and the brine forming vessel 40 are filled with water to a level L a slight distance above that of the foraminous platform 45 within the vessel, it will be seen that only a small amount of salt 46, preferably in pellet form, will be immersed in the water in the vessel to enter into solution and form brine. The brine thus formed, being heavier than water, circulates toward the bottom of the vessel from whence it may exit through the port 51 in the side of the vessel to flow through the brine valve and down the duct 58 into the brine storage tank 18. Brine thus entering the storage tank displaces the lighter water therein so that it circulates upwardly in the duct 58, through the brine valve 54, and into the bottom portion of the brine forming vessel by means of its port 51.

In this way, natural circulation of brine and water between the brine forming vessel and the brine storage tank will, over a period of time, produce concentrated brine in both the storage tank and the brine forming vessel. Consequently, that portion of the concentrated brine which is contained within the storage tank 18 will be available for use in recharging or regenerating the ion exchange material in the water softening tank 30.

During the formation of brine as described, the total volume of liquid in the brine forming vessel and the storage tank will, as a matter of course, increase due to the quantity of salt that must be dissolved in the water in order to form concentrated brine. This increase, which may amount to as much as 12%, raises the level of liquid in the brine forming vessel 40 to above the desired level L, and if the excess liquid in the vessel were not removed each time a new batch of brine was formed in the vessel, the liquid would eventually completely engulf the supply of salt in the bin 16 and overflow from the top of the bin. According to this invention, however, all of the excess brine formed between regenerating cycles is removed through the port 50 in the side of the brine forming vessel, by means of an overflow duct 62 having one end connected with said port and its other end communicating with a receptacle 63 mounted upon the lower shelf 26 in the front compartment 19 of the cabinet, alongside the water softening tank 30.

Figure 7:
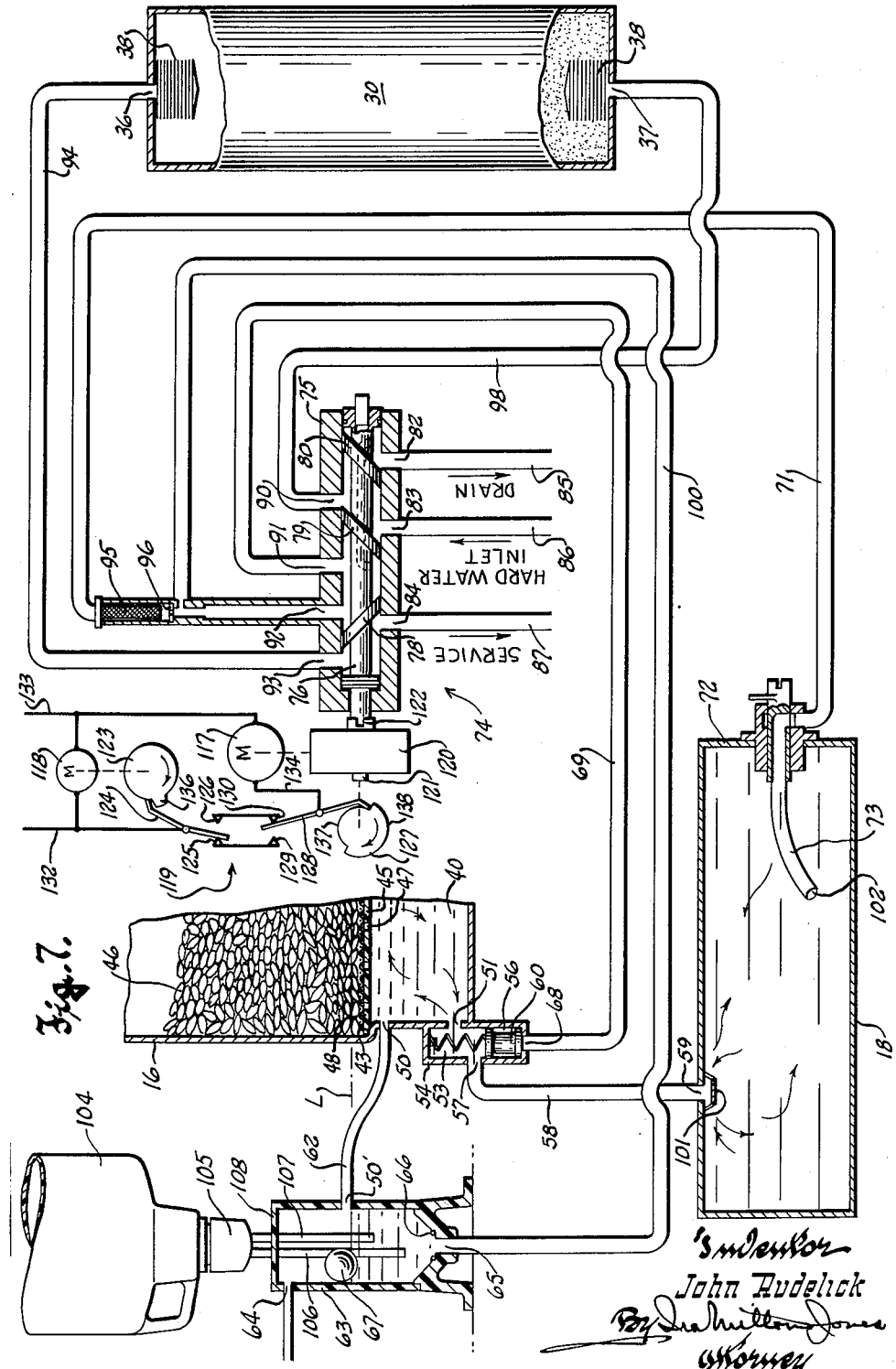
FIGURE 7 is a combination flow and wiring diagram depicting the routing of water during normal softening operation of the apparatus.

The duct 62 extends slightly upwardly from the port 50 and leads into a port 50′ in the side of the overflow receptacle 63 disposed substantially medially of its ends and located so as to determine the level L at which it is desired to maintain liquid in the brine forming vessel, see FIGURE 7. The port 50′, therefore, may be said to serve as an overflow port for the vessel 40.

Since the receptacle is formed of a clear or substantially transparent material, such as a suitable plastic, and normally contains liquid at the same level as that in the brine making vessel, it will be appreciated that the receptacle serves as a sight glass to enable the level of liquid in the vessel to be observed and compared with a mark (not shown) on the receptacle representing the desired level L of liquid in the system.

Near its upper end, the receptacle 63 is provided with an overflow port 64 which may be connected by a suitable length of hose or the like with a floor drain. As will be described in greater detail hereinafter, the receptacle 63 is provided with a discharge port 65 at its bottom, through which excess brine in the receptacle and the vessel communicated therewith may be educted during regeneration. The port 65 is surrounded by an O-ring 66 at the inside of the receptacle, which O-ring defines a valve seat that is adapted to be engaged by a spherical float 67 to terminate the eduction of brine from the receptacle.

Again referring to the brine valve 54, it will be recalled that the pressure responsive piston 60 thereof normally occupies a position within the lower compartment 56 of the valve during normal service operation of the softening apparatus of this invention. However, at times when it becomes necessary to recharge or regenerate the ion exchange material within the softener tank, the piston 60 must be moved upwardly into the upper compartment 53 of the brine valve in order to block off communication between the vessel 40 and the brine storage tank 18.

This is accomplished by subjecting the underside of the piston 60 to the pressure of water from the hard water source, namely, by connecting a port 68 in the bottom of the brine valve with the source of water to be softened through a duct 69.

Consequently, the pressure of water from the hard water source causes the piston 60 of the valve to be moved upwardly, against yielding spring bias, to its uppermost position seen in FIGURE 8 at which it closes the port 51 and allows hard water entering the valve through its bottom port 68 to flow out of its side port 57 and down through the duct 58 into the top of the brine storage tank 18. Preferably, fresh or hard water is constrained to enter the interior of the brine storage tank at a very slow rate so as not to create such turbulence in the tank as might cause admixture of the fresh water with the concentrated brine in the tank.

The fresh water thus introduced into the brine storage tank 18 causes concentrated brine to be expelled from the tank through a brine discharge duct 71 projecting through the center of the forward end wall 72 of the storage tank for delivery to the water softening tank 30.

Thus it will be seen that the brine making and storing means incorporated in the water softening apparatus of this invention functions in substantially the same manner as that of my aforesaid copending application, Serial No. 770,794, now abandoned, although it will be appreciated that the brine forming vessel and brine storage tank are separated from one another and located in portions of the softener cabinet at which they most efficiently make use of the limited space within the cabinet.

Rotation of the curved inner end 73 of the discharge duct 71, on the axis of the storage tank, to bring the mouth of the duct to different levels within the tank, effects regulation of the amount of concentrated brine which will be expelled from the tank before fresh rinse water begins to issue from the tank for use in flushing brine from the softener tank.

The water softening apparatus of this invention also includes a control valve, generally designated 74, for effecting the desired routing of liquid through the apparatus both during normal softening service thereof as well as regeneration of the ion exchange material in the water softening tank 30. The control valve 74 is preferably on the order of that disclosed in my aforesaid copending application Serial No. 770,794, now abandoned, and thus comprises a tubular body 75 having a valve element or spindle 76 freely rotatably received therein with portions of the spindle projecting through bearings in the opposite ends of the body, in sealed relation to the latter. As shown, the spindle is provided with three axially spaced oblique lands 78, 79, and 80 which completely encircle the spindle. Two adjacent lands 79 and 80 are disposed at the same angle with respect to the spindle axis but the third land 78 is disposed at an angle opposite to that of the lands 79 and 80.

The valve body is mounted on the shelf 26 at the lower portion of the front compartment 19 of the cabinet by any suitable means such as bolts, but with the axis of the body extending transversely of the cabinet and close to the front edge of the lower shelf 26. Preferably, the body is also located endwise adjacent to the side panel 8 of the cabinet so as to be as near as possible to the front end of the brine storage tank 18.

The valve body has three ports, 82, 83 and 84 in its underside. The port 82 connects with a drain duct 85, the port 83 connects with a hard water supply duct 86 and the port 84 connects with a service duct 87. At its upper side the valve body has a series of four ports designated 90, 91, 92 and 93. The port 93 is connected by a duct 94 with the port 36 in the upper end of the water softening tank 30. The brine discharge duct 71 communicates with the port 92 successively through a strainer 95 and a flow regulating member 96 having a small pin hole orifice therethrough. The duct 69 which communicates with the lower port of the brine valve 54 communicates with the port 91 in the valve body; and the remaining upper port 90 in the valve body is communicated with the lower port 37 of the softener tank through a duct 98.

In the normal or soft water position of the valve spindle 76 seen in FIGURE 7, the land 80 blocks communication between the drain port 82 and the port 90 which is communicated with the port 37 in the lower end of the softener tank 30. Likewise in this position, the lands 79 and 80 establish communication between the hard water inlet port 83 and the port 90 so as to enable hard water from the source thereof to flow into the lower end of the softener tank through the duct 98 and the lower port 37 of the tank. The land 79, however, blocks communication between the hard water inlet and the port 91 which is connected by the duct 69 with the bottom port of the brine valve 54.

The land 78 of the control valve establishes communication between the service port 84 of the valve body and the port 93 which connects with the upper end of the water softener tank through the duct 94. The same land, however, blocks communication between the service port 84 of the valve body and the ports 91 and 92 at the upper side of the body.

From the description thus far, it will be apparent that during normal softening operation of the apparatus, hard water entering the valve body through its port 83 is constrained to flow out of the upper port 90 in the body through the duct 98 into the bottom of the water softening tank 30 to flow through the ion exchange material therein and to issue from the top of the tank as softened water which is returned to the port 93 of the valve body through the duct 94 and then made available for flow to any taps with which the service duct 87 may communicate.

Rotation of the spindle of the control valve one-half a revolution to its position seen in FIGURE 8, initiates the regenerating cycle of the apparatus, during which concentrated brine and then fresh rinse water is caused to flow through the bed of base exchange material in the softener tank. Note that in this position of the control valve the service port 84 is directly communicated with the hard water inlet port 83 of the valve so that water is available throughout the entire regenerating cycle.

With the valve in its regenerating position shown in FIGURE 8, hard water from the source enters the valve body through port 83 and flows out of port 91 into duct 69 leading to the bottom of the brine valve 54. This forces the piston 60 of the valve upwardly into the upper chamber 53 to close off communication between the brine making vessel and the brine storage tank, and to communicate the bottom port 68 and side port 57 of the brine valve so that hard water flows through the valve, downwardly in the duct 58, and into the top port 59 of the brine storage tank 18, to cause concentrated brine in the tank to be expelled through its outlet duct 71. The brine thus expelled from the storage tank returns to the control valve where it enters the port 92 in the top of the valve body to be directed by the land 78 therein out of the port 93 and into duct 94 leading to the top of the water softener tank. The brine thus introduced into the upper end of the softener tank first expels the water in the tank downwardly through the bottom port 37 thereof and returns it to the control valve port 90 through the duct 98. Port 90, of course, is now in communication with the drain port 82.

It will be apparent, of course, that the concentrated brine delivered into the upper end of the tank will circulate down through the ion exchange material in the tank to recharge the same, and that the brine effluent will also be discharged from the bottom of the tank and through the control valve to drain.

When brine is expelled from the brine storage tank 18 and flows downwardly through the strainer 95 toward the control valve, it passes through the pin hole orifice in the flow controlling member 96. Because of this orifice, the flow controlling member serves as an injector to effect eduction of excess brine from the brine making vessel, through the receptacle 63 and the overflow duct which communicates it with the vessel. For this purpose, a duct 100 is connected at one end with the bottom port 65 of the receptacle, and its other end connects into the side of the duct 71 just below the flow controlling member 96 therein. Consequently, the jet of liquid issuing from the orifice in the flow controlling member 96 creates a low pressure area at the downstream side of the member to cause excess brine, namely that quantity of brine in the vessel which is above the desired level L, to be educted from the vessel through the receptacle 63 for passage to the water softener tank along with the concentrated brine expelled from the brine storage tank during regeneration. In this way, the excess brine is not wasted, as was formerly the case.

Besides serving as an injector the member 96 also serves to regulate and slow the flow of brine through the water softener tank 30 during regeneration. The restriction which it presents to liquid flow thus assures the desired very slow flow of fresh water into the top of the brine storage tank 18, for expulsion of concentrated brine therefrom, without danger of creating a turbulence within the tank by which the fresh water might mix with and cause dilution of the concentrated brine in the tank.

A deflector 101 shown in FIGURES 7 and 8 may also be used inside the brine storage tank where it is positioned directly opposite the top port 59 thereof to lie in the path of incoming fresh water to divert the same laterally along the top wall of the tank. This further minimizes the possibility of the fresh water entering the tank, at the desired slow rate, from diluting the concentrated brine in the tank.

The brining step in the regenerating cycle continues for a substantial period of time due to the slow flow of fresh water into the brine storage tank and the consequent slow expulsion of concentrated brine therefrom for passage through the water softener tank. Eventually, however, the level of concentrated brine in the tank drops to that of the mouth 102 of the brine discharge duct 71, and when that occurs only fresh water discharges from the brine storage tank to begin the rinsing step in the regenerating cycle.

Rinsing, of course, is effected while the control valve spindle remains in its regenerating position seen in FIGURE 8, and is accomplished by slowly flowing fresh hard water downwardly through the water softener tank. The rinse water discharging from the bottom port of the softener tank, of course, is led to the drain duct by the control valve.

After a suitable period of such rinsing, during which the ion exchange material in the softener tank has been cleansed of brine, the control valve may be rotated another 180° to return it to its original position seen in FIGURE 7 and again place the water softening apparatus in its service condition.

The spring acting upon the piston 60 of the brine valve 53 returns the piston to its lower or normal position in the bottom chamber 56 of the brine valve as soon as the control valve is returned to its service position, to thus close off communication between the bottom port 68 of the valve and its side port 57 and reestablish communication between the latter port and the lower port 51 in the side of the brine making vessel. The conditions necessary for natural circulation of brine formed in the brine making vessel down into the brine storage tank and the displacement of fresh water from the tank upwardly into the bottom portion of the brine making vessel are thus reestablished, and after a period of several hours the brine storage tank again will contain a full charge of concentrated brine.

At the beginning of the brining step described previously, however, it will be appreciated that the level of brine in the brine making vessel and in the sight glass receptacle 63 will be above the desired level L, due to the increase resulting from salt entering into solution with water in the system. During regeneration, however, all of the excess brine contained in the vessel 40 will be educted therefrom through the overflow duct and the receptacle 63 by the fast flowing jet of liquid issuing from the injector orifice in the flow controlling member 96, to lower the level of liquid in the brine making vessel to the desired level L. Thereafter, brine is educted from the receptacle 63 only, and just before the receptacle is entirely drained of brine in this fashion, the float 67 therein will be sucked down onto its O-ring seat 66 to terminate further eduction of brine from the receptacle. This, of course, assures against the undesirable entry of air into the system, which would otherwise occur if all of the brine were allowed to be educted from the receptacle 63, and the float remains in position closing the seat during the remainder of the regenerating cycle, until rinsing is completed.

It is another important feature of this invention that the receptacle 63 also serves as a chemical feed pot by which certain chemicals in liquid form may be fed into the water softener tank 30 during regeneration to effect cleansing of iron or other foreign substances from the ion exchange material. By way of example, a chemical such as sodium hydrosulphide may be admitted into the feed pot provided by the receptacle 63 to be educted therefrom during the regenerating cycle and caused to slowly percolate through the ion exchange material in the softener tank to dissolve any iron which may be fouling the mineral bed. This, of course, is extremely desirable in areas where the water supply contains quantities of iron.

Figure 2:
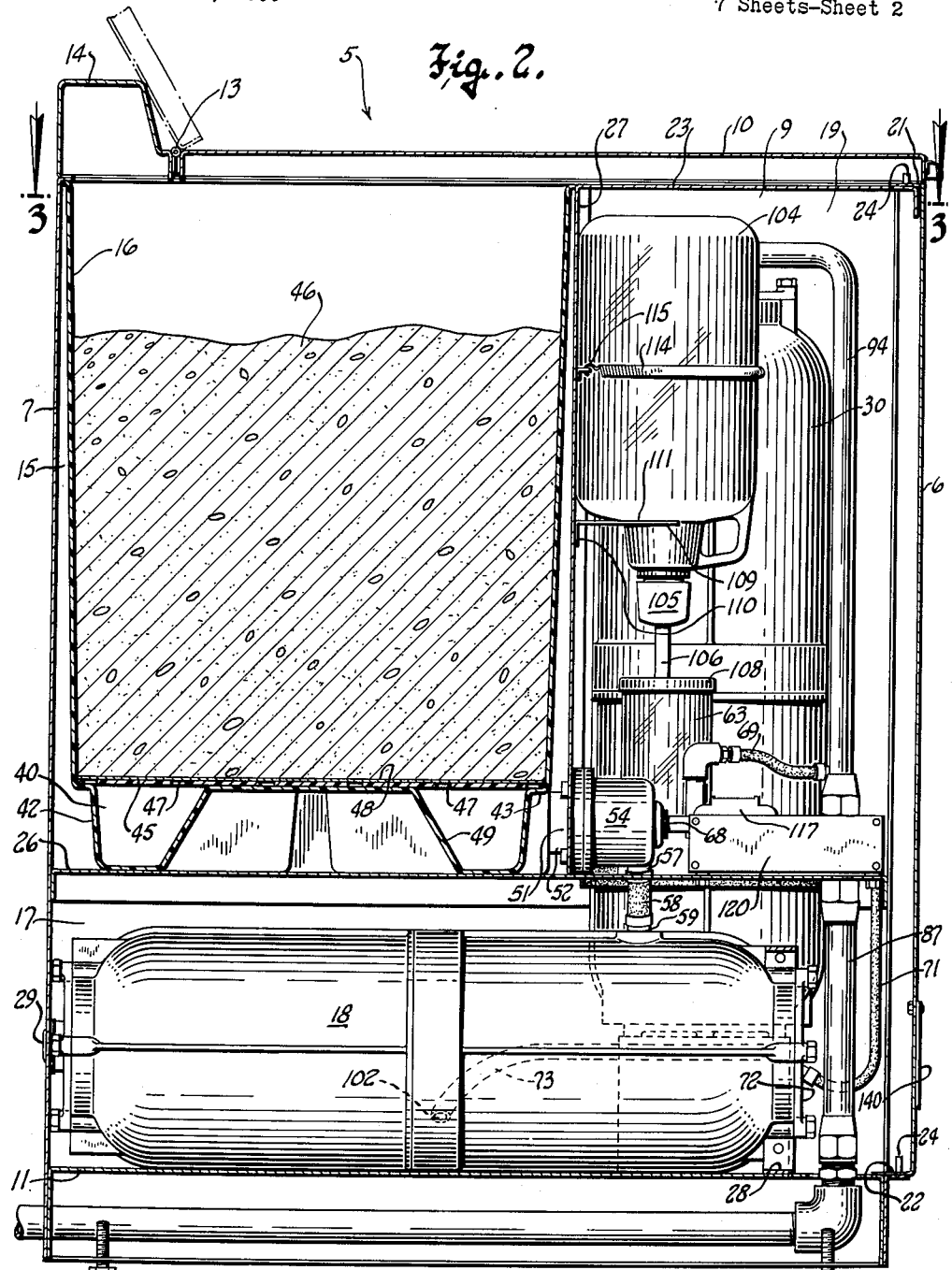
FIGURE 2 is a vertical sectional view through the softener shown in FIGURE 1, looking toward the right hand side of the cabinet.
Figure 3:
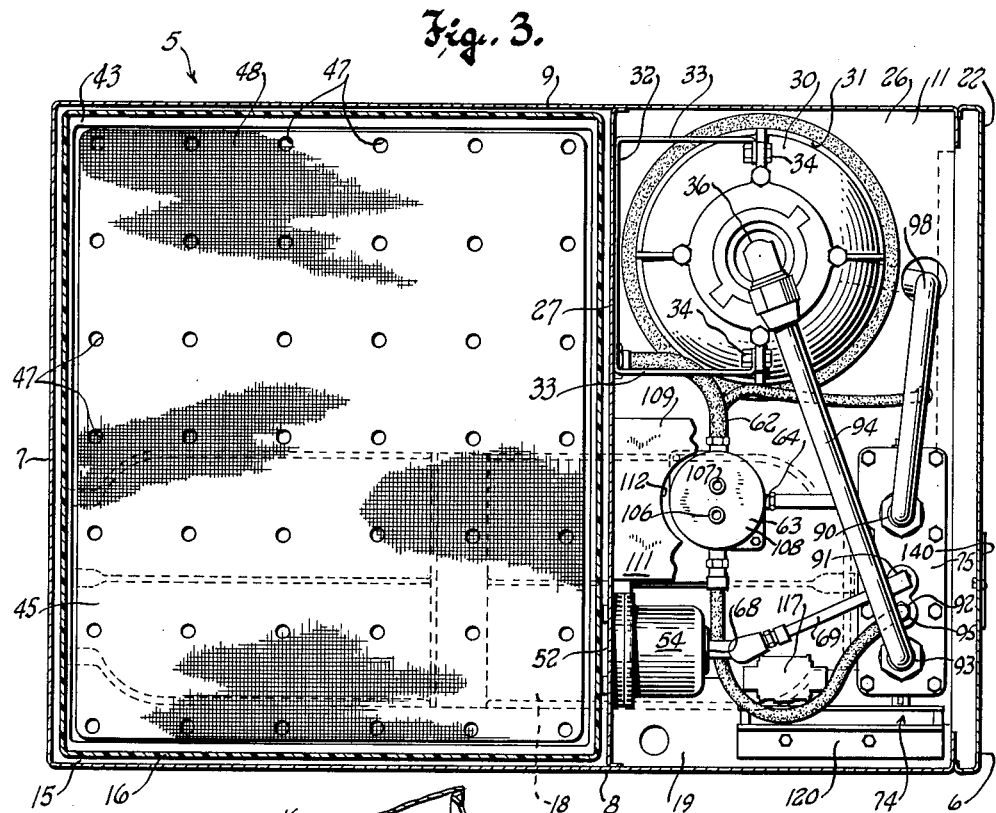
FIGURE 3 is a cross sectional view taken through FIGURE 2 on the plane of the line 3—3.
Figure 5:
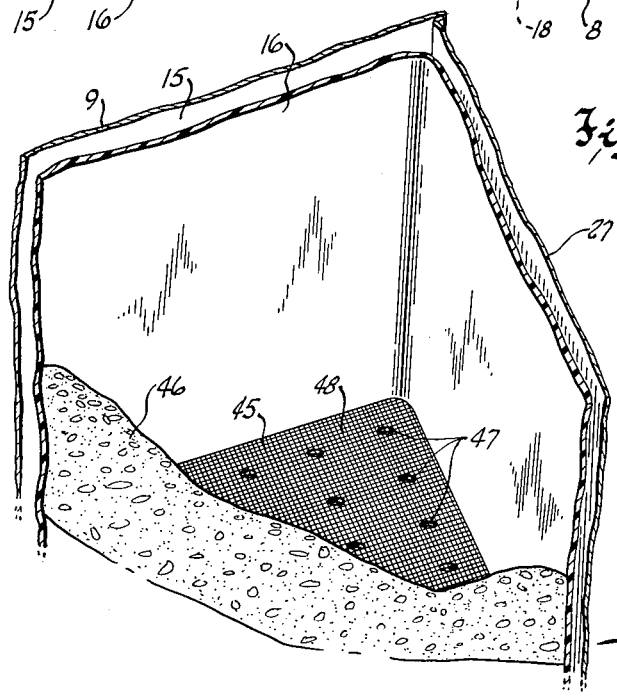
FIGURE 5 is a fragmentary perspective view looking down into the salt bin at the rear of the cabinet.
Figure 4:
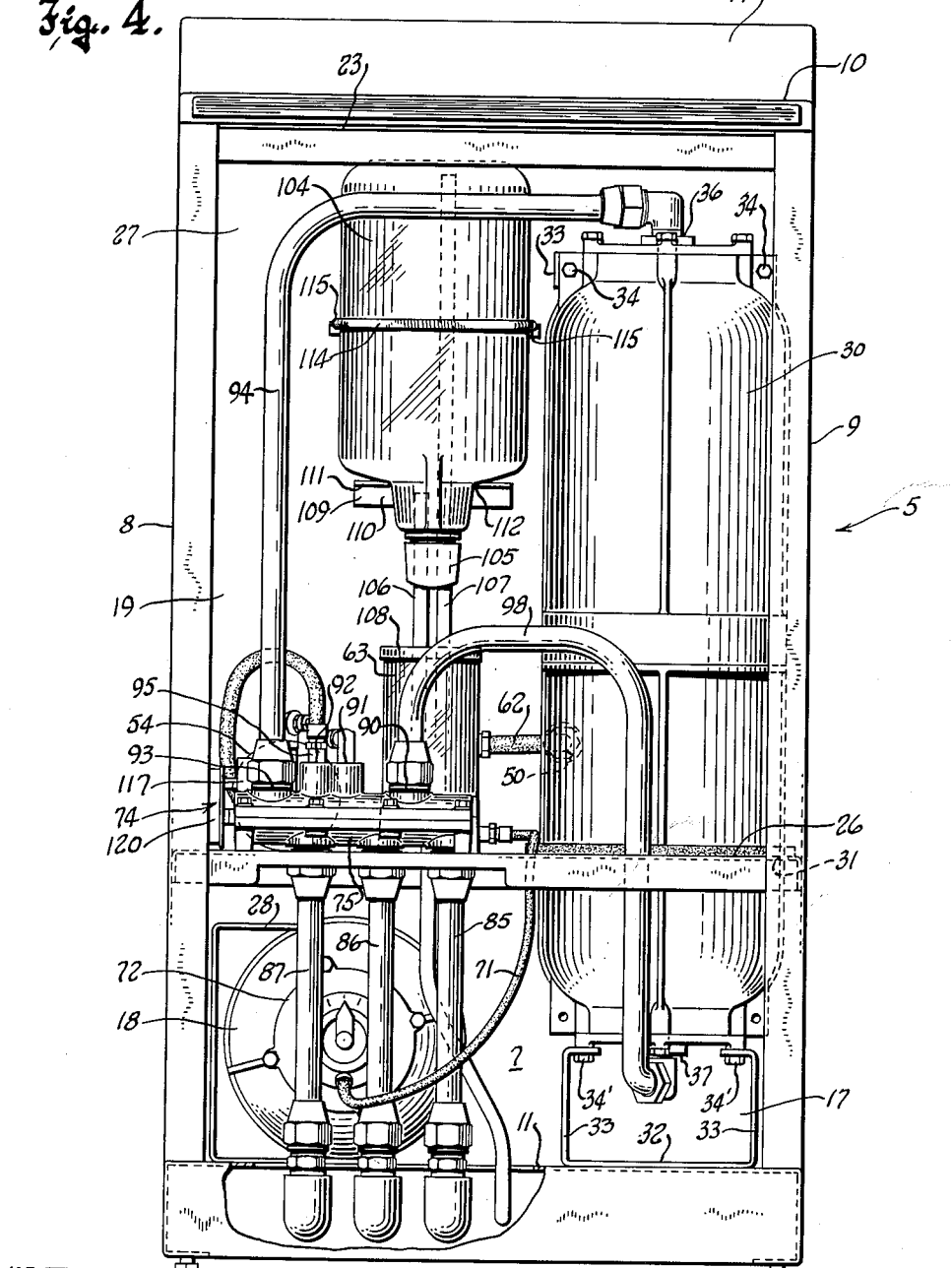
FIGURE 4 is a front elevation of the softener with the front panel of the cabinet removed.
Figure 6:
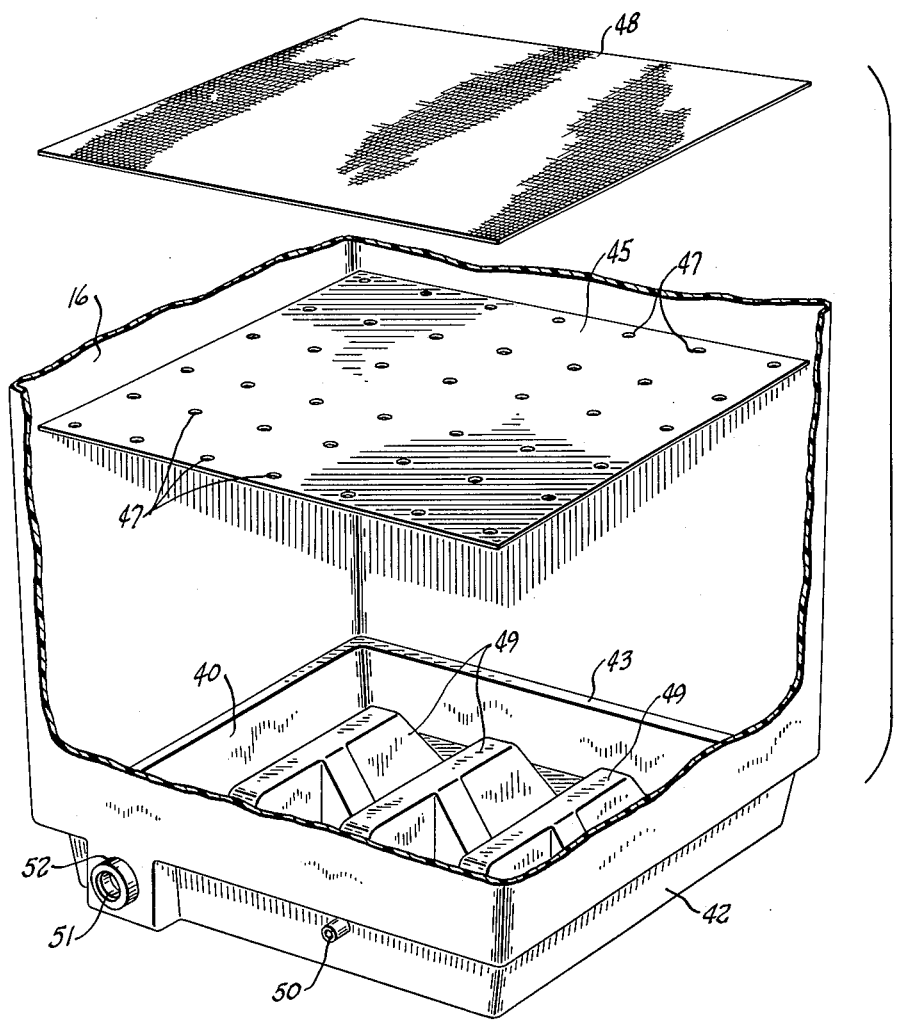
FIGURE 6 is a group perspective view of the components of the brine making vessel, the parts thereof being separated but in their proper order of assembly.

The desired chemical may be fed into the overflow receptacle 63 from a jug 104 mounted in an inverted position upon the partition 27, inside the front compartment 19, near the top thereof as shown best in FIGURES 2 and 4. The jug may have a special two-hole stopper 105 through which a pair of tubes 106 and 107 pass to project downwardly through the cover 108 of the feed pot 63 and into the interior of the latter.

A convenient way of mounting the jug 104 upon the partition 27 is by means of an L-shaped bracket 109 having an upright leg 110 welded or otherwise affixed to the partition 27 and a horizontal leg 111 projecting forwardly to receive the shouldered neck portion of the jug in an aperture 112 opening to the forward edge of the leg 111. A tension spring 114 having its opposite ends anchored, as at 115, to clips on the partition 27, passes around the front of the jug and serves to hold the same tightly against the partition 27 with its shouldered neck portion seated in the aperture of the leg 111 on the mounting bracket 109.

The tube 107 provides for the admittance of air into the upper end portion of the inverted jug, and for that purpose it projects up into the interior of the jug to a point near the bottom thereof, as seen in FIGURE 4. The air supply tube 107 may be adjusted in the stopper to have its lower end at any desired level beneath that of the side inlet of the feed pot, but spaced a distance above its bottom. The tube 106 provides for the flow of chemical from the jug to the interior of the receptacle, and its upper end may be located just inside the neck of the jug. Its lower end, for example, may be located at a level beneath that of the air supply tube 107.

The lower ends of both tubes are normally immersed in the brine contained in the feed pot 63, as shown in FIGURE 7, to prevent chemical from the jug from discharging thereinto. During regeneration, however, the eduction of excess brine from the system first restores the brine in the vessel 40 to the desired level L and thereafter causes liquid in the feed pot to drop to a level beneath the bottom of the air tube 107. When that occurs, the resulting venting of the jug interior allows chemical to flow into the receptacle through the tube 106 which, however, is so sized with respect to the rate of eduction from the receptacle that brine continues to be drawn from the receptacle faster than chemical is fed thereinto. When only a small amount of brine remains in the bottom of the feed pot, the ball float 67 therein is sucked down onto its seat 66, as seen in FIGURE 8, wherein it remains throughout the balance of the regenerating cycle, namely until the flow of liquid through the injector 96 is terminated. Chemical will continue to slowly flow into the feed pot or receptacle and it accumulates therein until the level of liquid in the pot rises to a height beyond the bottom of the air inlet tube 107. When that occurs, the feeding of chemical into the feed pot ceases and it is not resumed until the next regenerating cycle, during which the chemical then present in the feed pot will be educted therefrom and passed through the bed of ion exchange material in the softener tank to cleanse the same.

The amount of chemical thus automatically dispensed into the receptacle or feed pot 63 may be adjustably predetermined by sliding the air inlet tube up or down in the stopper 105.

According to this invention, electrically operated instrumentalities automatically provide for regeneration of the ion exchange material in the softener tank at periodic intervals. These instrumentalities include an electric motor 117 for imparting rotary motion to the spindle 76 of the control valve, timing mechanism comprising a synchronous electric clock motor 118, and cam operated switching mechanism 119 governed partly by the clock motor 118 and the spindle drive motor 117 for controlling the operation of the spindle drivemotor.

The motor 117 imparts rotary motion to the valve spindle through a gear reduction device 120, the output shaft 121 of which is jaw-coupled to the spindle 76 of the control valve as at 122. Consequently, whenever the electric motor 117 is energized, the gear reduction device driven thereby causes rotation to be transmitted to the spindle 76 of the control valve at a relatively slow rate.

The cam operated switching mechanism 119 includes a cam 123 driven by the clock motor 118 for actuating a switch arm 124, here shown as a medially pivoted blade, toward and from engagement with either of a pair of stationary contacts 125 and 126. The switching mechanism also includes a second cam 127 driven from the output shaft 121 of the gear reduction device, to be slowly rotated thereby whenever the electric motor 117 is energized. The cam 127 effects actuation of a switch arm 128, here shown as a medially pivoted blade, toward and from engagement with either of a pair of stationary contacts 129 and 130.

As shown in FIGURES 7 and 8, the stationary contacts of the switching mechanism are paired with the contact 125 permanently connected to the contact 129, and with the contact 126 permanently connected to the contact 130.

The cam 123 which is driven by the clock motor 118 may be termed a timing cam, while the cam 127 driven by the gear reduction device 120 may be considered as a rotation limiting cam by which rotation of the spindle 76 of the control valve is always stopped with the spindle in either its service position seen in FIGURE 7, or in its regenerating position seen in FIGURE 8, rotated one-half a turn from its service position.

The clock motor 118 is at all times connected across the conductors 132 and 133 of a 110 volt alternating current supply line so that the motor 118 operates continuously. The supply conductor 133 also connects with one of the terminals of the electric motor 117. The other supply conductor 132 is connected to the switch arm 124, and the switch arm 128 is connected to the other terminal of the spindle drive motor 117 by a conductor 134.

With the apparatus in its service condition shown in FIGURE 7, only the clock motor 118 is operating and it rotates the cam 123 in a clockwise direction. The switch arm 124 is about to be engaged by a lobe 136 on the timing cam 123 after only a slight degree of rotation of the cam beyond its position seen in FIGURE 7. When that occurs the switch arm 124 is disengaged from the stationary contact 125 and brought into engagement with its other stationary contact 126.

Also in the condition of the control instrumentalities seen in FIGURE 7, a cam follower on the switch arm 128 is in engagement with the low part 137 of the cam 127 that is driven by the gear reduction device 120. This low portion of the cam extends for about one half the circumference of the cam, and as long as the follower on the arm 128 engages it, the arm will be in engagement with the stationary contact 130.

When the timing lobe on the timing cam 123 actuates the switch arm 124 and throws it into engagement with its stationary contact 126, it initiates a regenerating cycle by completing an energizing circuit for the electric motor 117, across the now bridged contacts 126 and 130 of the switch mechanism. This starts the spindle drive motor operating to transmit rotation to the spindle 76 of the control valve and to the cam 127. When the spindle 76 is rotated through an angle of 180° from its position seen in FIGURE 7, to its regenerating position seen in FIGURE 8, the high portion 138 of the cam 127 will engage the follower on the switch arm 128 to disengage it from the stationary contact 130 and swing it into engagement with its other stationary contact 129, thus interrupting the energizing circuit for the electric motor 117 and stopping the spindle 76 in its FIGURE 8 position.

The spindle of the control valve will remain in its FIGURE 8 position during the entire regenerating period, the duration of which is determined by the arcuate length of the lobe 136 on the timing cam 123. As soon as the lobe passes under the follower on the switch arm 124, however, the follower drops onto the low portion of the timing cam and the switch arm is reengaged with the stationary contact 125 of the switching mechanism.

Since the switch arm 128 is then also in engagement with its stationary contact 129 and the latter is paired with the stationary contact 125, the electric motor 117 is caused to be reenergized through the now bridged contacts 125 and 129 to drive the spindle 76 of the control valve through another angle of 180° to its starting position seen in FIGURE 7, determined by the reengagement of the cam follower on the switch arm 128 with the low portion 137 of the cam 127. At that time the condition of the parts will be as indicated in FIGURE 7, where regeneration has been entirely completed and the apparatus is restored to its service condition.

It has been found that the slow flow of concentrated brine over the ion exchange resin in the softener tank in the manner described, assures the most efficient and thorough rejuvenation of the resin with a minimum quantity of salt. This is especially true with the downflow type of regeneration that is characteristic of the water softening apparatus of this invention.

Although the apparatus described is small and compactly arranged in an attractive cabinet, it achieves a 15,000 grain per day rating, using only ½ a cubic foot of synthetic ion exchange resin in the softener tank, and with the mouth 102 of the brine delivery duct adjusted close to the bottom of the brine storage tank for maximum withdrawal of brine therefrom. When so adjusted, the unit uses a maximum of about 7½ pounds of salt, and recharging, or regeneration is effected daily at the dictation of the electrically operated timing mechanism.

The unit is adjustable to a minimum capacity of 4000 grains, at which it daily consumes only 1 pound of salt. That adjustment is achieved merely by rotating the inner end 73 of the brine delivery duct to a position at which its mouth is in the upper portion of the brine storage tank 18. A swinging disc 140 on the front panel 6 of the cabinet normally covers a hole 141 in the panel through which access may be had for adjustment of the mouth of the brine delivery duct as described.

The highly economical nature of the unit is aptly demonstrated by the fact that when it is adjusted for its minimum daily capacity of 4,000 grains, it will efficiently soften 200 gallons of water rated at 20 points hardness, which is considered adequate for the needs of a family of four people using the 50 gallons per day standard of reference.

In comparison, larger conventional softeners having as much as ¾ cubic foot of synthetic ion exchange resin in their mineral tanks can achieve a rating of only about 15,000 grains, with daily regeneration requiring as much as 15 pounds of salt per regenerating cycle.

The savings in water required to effect a complete regenerating cycle including brining and rinsing, are equally as impressive. Whereas comparable conventional softeners use about 60 gallons of water for each regenerating cycle, the unit of this invention requires only 12 gallons. This characteristic of the unit makes it highly desirable for use in areas where the conservative use of water is imperative.

From the foregoing description, together with the accompanying drawings, it will be apparent to those skilled in the art that this invention provides an automatic water softening apparatus for domestic use that is comprised of small components that can be housed in a compact and neat appearing modern cabinet of countertop height, and which, despite its small size, is easily capable of supplying the demands of large as well as small families, and which, moreover, uses less salt and far less water during regeneration, than conventional domestic softeners.

What is claimed is my invention is:

1. The method of regenerating ion exchange material which is characterized by: flowing fresh water under pressure, from a source thereof, into the highest point in a substantially closed brine storage tank which is filled with concentrated brine and which has an outlet spaced below its highest point, to thereby displace concentrated brine out of the tank through said outlet; regulating the delivery of fresh water into the brine storage tank to a rate slow enough to minimize admixture of fresh water with concentrated brine in the tank; continuiing the flow of fresh water into the tank after the level of concentrated brine in the tank falls below the outlet, so that thereafter fresh water will be expelled out of the outlet; passing the liquid expelled from the tank outlet, as it debouches therefrom, downwardly through ion exchange material, so that first brine and then fresh water is passed through the material to successively effect brining and rinsing thereof; terminating the flow of fresh water into the brine storage tank after a predetermined period of time to thus terminate rinsing of the ion exchange material; after terminating the flow of fresh water into the brine storage tank, communicating the highest point in the brine storage tank with the bottom of a vessel which is at a level above the brine storage tank and in which vessel a quantity of water is maintained in contact with the bottom of a store of salt, to thus replenish the brine storage tank with concentrated brine by gravity action as the salt is dissolved; withdrawing from said vessel, while fresh water is flowing into the brine storage tank to expel concentrated brine therefrom, all of the brine in said vessel which is above a predetermined level slightly higher than the bottom of the store of salt; and conducting the brine withdrawn from said vessel through the ion exchange material.

2. The method of claim 1, further characterized by: first passing the brine withdrawn from said vessel into a pot before conducting such withdrawn brine through the ion exchange material; conducting the brine from said pot through the ion exchange material along with the liquid expelled from the outlet of the brine storage tank; and feeding a chemical agent into said pot for passage of such chemical agent through the ion exchange material during regeneration.

3. The method of claim 1, further characterized by: utilizing the flow of concentrated brine displaced out of the brine storage tank to educt from said vessel all of the brine therein which is above a predetermined level slightly higher than the bottom of the store of salt, so that the brine educted from said vessel is added to the brine issuing from the brine storage tank for passage through the ion exchange material.

4. The method of claim 3, further characterized by: feeding a chemical agent into a feed pot which has an inlet communicated with said vessel in overflow relation thereto and has an outlet spaced below said inlet and eductively communicated with the outlet of said brine storage tank, so that the eduction of brine from said vessel, through the feed pot, also effects passage of such chemical agent through the ion exchange material.

5. The method of claim 4, further characterized by: blocking said outlet of the feed pot when liquid therein reaches a predetermined level above said outlet and below said inlet, to prevent air from being drawn into liquid being passed through the ion exchange material.

6. In domestic water softening apparatus: a control valve adapted in a service setting to direct hard water from a source thereof under pressure through a bed of ion exchange material and in another setting thereof to block such flow of source water through the bed and effect flow of brine from a store thereof through the bed; a cabinet of counter top height housing the components of the water softener, said cabinet having opposite upright walls, a movable top wall providing a cover, wall means including a horizontal partition member extending entirely across the interior of the cabinet and defining the top of a compartment in the bottom of the cabinet, and an upright partition member extending transversely across the cabinet above said bottom compartment to define another compartment adjacent to one of the upright walls of the cabinet, said partition member being continued over said other compartment to close the same at the top of the cabinet, said horizontal partition member cooperating with said upright partition member and the cabinet walls to define a large upright compartment in which brine may be generated and salt may be stored; an elongated softener tank mounted in an upright position in said other compartment and containing said bed of ion exchange material, said horizontal partition member having a hole therein through which the lower portion of the softener tank extends; an elongated substantially closed storage tank adapted to hold said store of brine; means supporting said brine storage tank from the cabinet walls with the storage tank disposed horizontally in said bottom compartment; means in the cabinet defining a brine generating unit independent of the brine storage tank and laterally adjacent to the softener tank, said brine generating unit comprising a large receptacle received within said large upright compartment and resting upon said horizontal partition member, said large receptacle providing a substantially shallow brine making vessel at its bottom, adapted to hold a supply of water with the surface thereof at a predetermined level above the bottom of the vessel, and the receptacle providing a large and deep salt storage bin located over the vessel and extending upwardly alongside the softener tank to the top of the cabinet, said bin having a foraminous bottom wall supported at a level spaced a distance above the bottom of the vessel and slightly beneath said predetermined level, and upon which foraminous wall a substantial store of salt may be supported in a dry state with only a thin layer of salt immersed in water to form brine which may gravitate freely and directly into the vessel through the foramina of said foraminous bottom wall; means affording controllable communication between said vessel and the brine storage tank so as to provide for gravity induced exchange of water introduced into the storage tank for brine in the vessel, except when communication between the vessel and the storage tank is blocked; means providing a water supply duct which debouches into an uppermost interior portion of the storage tank and which is communicable with the water source through the control valve in said other setting thereof; a brine delivery duct connected with the brine storage and softener tanks to communicate the same through the control valve in said other setting thereof, and through which brine in said storage tank is expelled for flow through the softener tank as a consequence of introduction of source water under pressure into said uppermost portion of the brine storage tank when communication between it and said vessel is blocked; a smaller receptacle mounted upon the horizontal partition member in said other compartment, alongside said vessel and the softener tank; a duct connecting the vessel with said smaller receptacle and through which excess brine in the vessel may be transferred to said smaller receptacle for the determination of said predetermined level of liquid in the vessel; a discharge duct having one end connecting with the bottom of said smaller receptacle and its other end connecting with the brine delivery duct; and means providing an injector in said brine delivery duct adjacent to its junction with said discharge duct to effect eduction of brine from the receptacle as a consequence of the flow of brine through said brine delivery duct from the storage tank.

7. The water softener of claim 6 further characterized by: a container mounted upon said upright partition member, in said other compartment and in a position above said receptacle, said container being adapted to hold a supply of chemical that is capable of exerting a cleansing effect upon the bed of mineral in the softener tank; and means for feeding chemical from said container into the receptacle for eduction therefrom along with brine contained in the receptacle.

8. In combination: a water softening system including a softener tank containing ion exchange material which must be regenerated with brine from time to time; control valve means for governing operation of the system, said control valve means being operable in one setting thereof to direct source water through the softener tank so that such source water is softened by contact with the ion exchange material in the softener tank, and said control valve means being operable in another setting thereof to prevent the flow of source water into the softener tank; a substantially large salt storage bin; means in the bottom of the bin defining a brine making vessel adapted to hold water with the surface thereof at a predetermined level; a foraminous platform in the vessel supported thereby at a level a distance above the bottom thereof, but slightly beneath the surface of water in the vessel, said platform providing means upon which a store of dry salt may be supported in the bin with only a thin layer of such salt immersed in water contained in the vessel to form brine which may freely and directly gravitate into the vessel through the foramina of said foraminous platform; means providing a substantially closed brine storage tank below said vessel and independent thereof, which brine tank may be filled with water; means communicating said vessel and storage tank to provide for gravity exchange of the contents thereof whereby over a period of time the liquid contents of both the vessel and the storage tank will be converted to concentrated brine; means controlling communication between the vessel and the storage tank whereby the storage tank may be closed off from the vessel; duct means for conducting water into the uppermost portion of the brine storage tank, said duct means being connected with the control valve means to have source water diverted thereinto in said other setting of the control valve means; means providing a discharge duct for the brine storage tank through which concentrated brine in the storage tank is expelled as a consequence of the delivery of source water under pressure into said uppermost portion of the storage tank at times when the brine storage tank is closed off from said vessel, said brine discharge duct being communicated with the softener tank through the control valve means in said other setting thereof; a receptacle having an outlet in its lower portion; a duct connecting the receptacle in overflow relation with the brine making vessel and cooperating therewith to provide for establishment of said predetermined level of liquid in the vessel; an outlet duct connecting the outlet of said receptacle with the brine discharge duct; and ejector means in the brine discharge duct adjacent to its junction with said outlet duct whereby excess brine accumulated in the vessel may be withdrawn therefrom through the overflow receptacle and fed into the brine discharge duct as a consequence of the flow of brine through the latter, and delivered to the softener tank along with brine fed thereto from the storage tank.

9. In a brine making and dispensing device, the combination of: means providing a brine forming vessel; a substantially closed brine storage tank mounted beneath the vessel and independent thereof; means affording controllable communication between the vessel and tank so as to provide for gravity induced exchange of brine formed in the vessel for water in the tank except at times when communication between the vessel and tank is blocked; means providing a receptacle mounted alongside the vessel and having an outlet adjacent to its bottom; a transfer duct connecting the vessel with the receptacle in overflow relation to maintain a desired level of brine in the vessel and so that excess brine in the vessel may be removed therefrom in consequence of withdrawal of brine from the receptacle; a brine delivery duct communicating with the storage tank, for conducting brine therein to a point of use; means providing a water supply duct which debouches into an uppermost interior portion of the storage tank, by which water under pressure may be admitted to the storage tank to cause brine to be expelled therefrom through said delivery duct, at times when communication between the vessel and the tank is blocked; means operable in consequence of the flow of brine through said delivery duct to effect withdrawal of excess brine from the vessel through said receptacle and feeding of such excess brine into the delivery duct; a container adapted to hold a supply of a chemical in liquid form; and means operable as a consequence of withdrawal of brine from the receptacle for automatically effecting the feeding into the receptacle of a predetermined quantity of chemical from said container.

10. In a brine making and dispensing device: means defining an upwardly opening salt bin; means in the bottom of the bin defining an upwardly opening brine forming vessel adapted to hold a predetermined amount of water; a receptacle mounted alongside the vessel; an overflow duct connected between the vessel and the receptacle and through which liquid in the vessel in excess of said predetermined amount may be transferred to the receptacle; a foraminous platform extending across the interior of the vessel and carried thereby at a level spaced a distance above the bottom thereof, and such as to be only slightly beneath the surface of said predetermined amount of water in the vessel, for supporting a substantial store of dry salt in the bin with only a thin layer of such salt at platform level immersed in water contained in the vessel to form brine which may freely and directly gravitate into the vessel through the foramina of said foraminous platform; a substantially closed brine storage tank independent of the bin and vessel, and adapted to be filled with water; means mounting said brine storage tank in fixed relation to the vessel and at a level beneath that of the bottom of the vessel; means providing controllable communication between the vessel and storage tank so as to enable gravity induced exchange of water in the tank for brine in the vessel except when communication between the vessel and the storage tank is blocked; means providing a water supply duct connected with the brine storage tank to debouche into an uppermost interior portion of the tank; a brine delivery duct connected with the storage tank and through which brine therein is expelled from the tank and conducted to a point of use as a consequence of the introduction of water under pressure into said uppermost portion of the tank at times when communication between it and the vessel is blocked; means providing a discharge duct having its mouth opening into the interior of said receptacle at the bottom portion thereof, and connecting the same with the brine delivery duct; and means in the brine delivery duct adjacent to its junction with said discharge duct providing an injector which is operable to effect eduction of excess brine from the said receptacle, and injection of such brine into the brine delivery duct in consequence of the flow of brine from the storage tank through the brine delivery duct to a point of use.

11. The brine making and dispensing device of claim 10, further characterized by the provision of float valve means in said receptacle adapted to close off communication between the interior of the receptacle and the discharge duct in response to the eductive effect of the injector when liquid in the receptacle reaches a predetermined low level above the mouth of the discharge duct.

12. The brine making and dispensing device of claim 11 further characterized by: the fact that the mouth of said discharge duct opens upwardly into the receptacle from its bottom; and wherein said float valve comprises means on the receptacle providing a valve seat at the mouth of said discharge duct, and a ball float in the receptacle normally held off of said valve seat by brine in the receptacle but which float is adapted to be pulled down onto said seat to close the same by the eductive action of said injector before all of the brine is educted from the receptacle.

13. The brine making and dispensing device of claim 10 further characterized by: the provision of means for feeding into said receptacle a chemical agent which is adapted to exert a cleansing effect upon ion exchange material in a water softening tank with which the delivery duct of the brine making and dispensing device may be connected, so that said chemical may be fed to the softener tank along with brine educted from the receptacle during said expulsion of brine from the storage tank.

14. In water softening apparatus: a cabinet providing a housing; means in the housing providing a bin adapted to store a substantial quantity of salt; means in the bottom of the bin providing a vessel adapted to hold a supply of water; a liquid level defining receptacle connected in fluid transfer relation with the vessel at one side thereof, for maintaining liquid in the vessel at a predetermined normal level; means providing a foraminous platform in the vessel extending horizontally thereacross at a location a distance above its bottom and slightly beneath said predetermined level, for supporting the dry salt stored in the bin with only a thin layer of such salt at platform level immersed in the supply of water to form brine which may freely and directly gravitate into the vessel through the foramina in said foraminous platform; a substantially closed brine storage tank adapted to be filled with water; means mounting the brine storage tank in the cabinet below said vessel; means providing controllable communication between said vessel and the tank so as to enable the tank to be connected with the vessel for gravity-induced exchange of the contents thereof, whereby over a period of time the contents of both the vessel and tank will be converted to concentrated brine, said last-named means providing for blocking communication between the vessel and the tank; duct means providing for the introduction of water under pressure into the uppermost portion of the brine storage tank; duct means providing an outlet from said tank through which concentrated brine is expelled for travel to a point of use, in consequence of the introduction of water under pressure into said uppermost portion of the tank at times when communication between it and the vessel is blocked; means comprising an injector in the last named duct means and a discharge duct connected between said liquid level defining receptacle and said injector for conducting excess brine from the vessel to said point of use as a consequence of said expulsion of brine from the storage tank; means in the liquid level defining receptacle providing a valve seat at the mouth of said discharge duct; and a float in said receptacle normally held off of said valve seat by brine in the receptacle but adapted to be pulled down onto said seat by the eductive action of the injector before all of the brine is drawn from the receptacle.

15. In domestic water softening apparatus; a cabinet having opposite upright walls, a horizontal partition wall extending entirely across the interior of the cabinet nearer the bottom than the top thereof and defining the top of a bottom compartment in the cabinet, and an upright partition member extending transversely across the cabinet above said horizontal partition wall and cooperating with said horizontal partition wall and the upright walls of the cabinet to define a large upright compartment and another compartment adjacent to one of the upright walls of the cabinet; an elongated softener tank mounted in an upright position in said other compartment and containing a bed of ion exchange material, said softener tank having its bottom portion received in the bottom compartment through a hole in the horizontal partition wall; an elongated substantially closed storage tank adapted to hold a store of brine, disposed horizontally in said bottom compartment and extending substantially entirely across the cabinet so as to be located beneath said large upright compartment and laterally adjacent to the bottom portion of the softener tank; means in the cabinet defining a brine generating unit independent of the brine storage tank, comprising a large receptacle received within said large upright compartment and resting upon said horizontal partition wall, and a foraminous platform in the vessel extending horizontally thereacross, near to but spaced above its bottom, defining a substantially large salt bin in the vessel thereabove in which a substantial store of salt can be supported on the platform with its lower portion in contact with water in the lower part of the vessel; liquid level defining means in said other compartment connected in fluid transfer relation with the vessel at one side thereof for maintaining liquid in the vessel at a predetermined level slightly above said foraminous platform so that a store of salt thereon will remain in a dry state with only a thin bottom layer thereof immersed in water to form brine which can gravitate freely and directly into the bottom portion of the vessel through the foramina of said platform; means affording controllable communication between the lower portion of said vessel and the brine storage tank so as to provide for gravity induced exchange of water introduced into the storage tank for brine in the vessel except when communication between the vessel and the storage tank is blocked; duct means providing an outlet from said brine storage tank communicated with the softener tank; other duct means providing for the introduction of water under pressure into the uppermost portion of the brine storage tank to effect transfer of brine to the softener tank at times when communication between the brine storage tank and said vessel is blocked; means including a discharge duct connected between said liquid level defining means and the first designated duct means for conducting excess brine from the vessel to the softener tank; and control valve means in the cabinet for alternatively directing water from a source thereof to the softener tank for normal service operation or to said other duct means for effecting regeneration of ion exchange material in the softener tank, and for effecting blocking of communication between the vessel and the brine storage tank during regeneration.

References Cited in the file of this patent

UNITED STATES PATENTS

| | | |
|---|---|---|
| 976,665 | Ledoux | Nov. 22, 1910 |
| 1,661,675 | Norquist | Mar. 6, 1928 |
| 1,693,829 | Sweeney | Dec. 4, 1928 |
| 1,704,982 | Lindsay | Mar. 12, 1929 |
| 1,751,061 | Ter Beest | Mar. 18, 1930 |
| 2,265,225 | Clark | Dec. 9, 1941 |
| 2,596,822 | Pick | May 13, 1952 |
| 2,767,139 | Haman | Oct. 16, 1956 |
| 2,880,872 | Albertson | Apr. 7, 1959 |
| 2,906,332 | Rosten et al. | Sept. 29, 1959 |